(12) United States Patent
Ramanjani

(10) Patent No.: US 12,314,785 B2
(45) Date of Patent: *May 27, 2025

(54) HIGH SPEED MAINFRAME APPLICATION TOOL

(71) Applicant: FIDELITY INFORMATION SERVICES, LLC, Jacksonville, FL (US)

(72) Inventor: Rajiv Ramanjani, Bangalore (IN)

(73) Assignee: FIDELITY INFORMATION SERVICES, LLC, Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/360,213

(22) Filed: Jul. 27, 2023

(65) Prior Publication Data

US 2024/0028430 A1 Jan. 25, 2024

Related U.S. Application Data

(63) Continuation of application No. 17/837,535, filed on Jun. 10, 2022, now Pat. No. 11,755,388, which is a (Continued)

(30) Foreign Application Priority Data

Jul. 12, 2021 (IN) .............................. 202111031219

(51) Int. Cl.
*G06F 9/54* (2006.01)
*G06F 9/4401* (2018.01)
*G06F 9/48* (2006.01)

(52) U.S. Cl.
CPC ............ *G06F 9/544* (2013.01); *G06F 9/4411* (2013.01); *G06F 9/4881* (2013.01)

(58) Field of Classification Search
None
See application file for complete search history.

(56) References Cited

U.S. PATENT DOCUMENTS 10,070,161 B2 9/2018 Harrell et al.
11,062,358 B1 7/2021 Lewis et al.
(Continued)

*Primary Examiner* — Umut Onat
(74) *Attorney, Agent, or Firm* — FINNEGAN, HENDERSON, FARABOW, GARRETT & DUNNER, LLP

(57) ABSTRACT

Computer-implemented systems and methods for analyzing applications include, obtaining user data records from a server, constructing an instruction template, the instruction template includes main streams, the instruction template adding the user data records as user parameters corresponding to the main streams, transmitting the user data records to a file transfer connection, inputting the instruction template and a first command into the file transfer connection, the file transfer connection executes the first command, inputting the file transfer connection and a second command into the script file, the script file executes the second command, opening each of the main streams through the pre-defined driver program by using variable records to retrieve a plurality of in-streams of each of the main streams, aggregating the main streams and the in-streams associated with the user parameters resulting a final output, transmitting the final output to the server.

20 Claims, 8 Drawing Sheets

Related U.S. Application Data continuation of application No. 17/461,116, filed on Aug. 30, 2021, now Pat. No. 11,392,432.

(56) References Cited

U.S. PATENT DOCUMENTS

| | | | |
|---|---|---|---|
| 2006/0218601 A1* | 9/2006 | Michel | H04N 21/858 348/E7.071 |
| 2011/0145858 A1* | 6/2011 | Philpott | H04N 21/812 725/32 |
| 2012/0016753 A1* | 1/2012 | Cobb | G06Q 30/0277 705/14.73 |
| 2013/0305276 A1* | 11/2013 | Barhate | H04N 21/6125 725/32 |
| 2017/0094327 A1* | 3/2017 | Harrell | H04N 21/23439 |
| 2017/0295410 A1 | 10/2017 | Bloch et al. | |
| 2018/0218400 A1 | 8/2018 | Kerns | |

\* cited by examiner

HIGH SPEED MAINFRAME APPLICATION TOOL

CROSS-REFERENCE TO RELATED APPLICATIONS

This application is a continuation of U.S. patent application Ser. No. 17/837,535, filed on Jun. 10, 2022, issued as U.S. Pat. No. 11,755,388 on Sep. 12, 2024, which is a continuation of U.S. patent application Ser. No. 17/461,116, filed on Aug. 30, 2021, issued as U.S. Pat. No. 11,392,432 on Jul. 19, 2022, all of the contents of which are hereby incorporated by reference in their entirety.

TECHNICAL FIELD

The present disclosure generally relates to computerized systems and methods for processing data and providing analysis and insights generated through mainframe systems and models.

BACKGROUND

A mainframe is a computer used by many large organizations for critical applications, bulk data processing (such as the census and industry and consumer statistics, enterprise resource planning, and large-scale transaction processing. Generally, mainframe computers may be a large, centralized machine that contains a large amount of memory, a large amount of storage space, and multiple processors, so it has ultra-processing power comparing to standard computer systems.

The importance of mainframe computers is increasing for large scale organization, scientific research, consumer statistics, and census data, because it is capable to execute multiple complex programs concurrently at high speed. Mainframe computers can be used in many different areas, such as health insurance processing, retail, e-commerce, and airline reservation systems.

Organizations from different industries offer a variety of services and products. Many of these products offer different incentives or features. Mainframe computers analyze these products in a closed system with highly secure and high performance capabilities.

For example, financial services provided by a financial institution, ticket reservation systems for railways and airlines, inventories for retail companies, etc., can use mainframe systems to execute massive transactions in short duration. Mainframe systems can also run in a batch mode overnight processing of scheduled programs.

Mainframe systems would generally consist of more than hundreds or close to thousand instructions, also referred to as "job control languages" (JCLs), depending on the size of the application. Further, these JCLs have many input and output files which take a long period of time to analyze an entire application on mainframe.

Difficulties associated with analyzing one application on a mainframe can cause high analysis time and may require more support for complex applications. These and other technological problems have complicated advances to analyze an application on mainframe. Moreover, existing mainframe systems analyzing simple applications can take at least more than a week.

Therefore, a need exists for high-speed analysis of applications on mainframes. The present disclosure is directed to addressing these and other challenges.

SUMMARY

One aspect of the present disclosure is directed to a computer-implemented system. The system comprises a non-transitory computer-readable medium configured to store instructions and at least one processor configured to execute the instructions to perform operations. The operations include obtaining, from at least one data store, at least one user data record from a server, constructing an instruction template, the instruction template comprises a plurality of main streams, the instruction template adding the at least one user data record as a plurality of user parameters corresponding to the main streams, transmitting the at least one user data record to a file transfer connection, inputting the instruction template and a first command into the file transfer connection, the file transfer connection being configured to execute the first command, inputting the file transfer connection and a second command into the script file, the script file being configured to execute the second command, transmitting the main streams into a pre-defined driver program, opening each of the main streams through the pre-defined driver program by using pre-defined variable records to retrieve a plurality of in-streams of each of the main streams, aggregating the main streams and the in-streams associated with the user parameters resulting a final output, transmitting the final output to the server; and receiving a visualization from the server, created by processing the final output.

Other aspects of the present disclosure are directed to computer-implemented methods for performing the functions of the computer-implemented systems discussed above.

Other systems, methods, and computer-readable media are also discussed herein.

DETAILED DESCRIPTION

Figure 1:
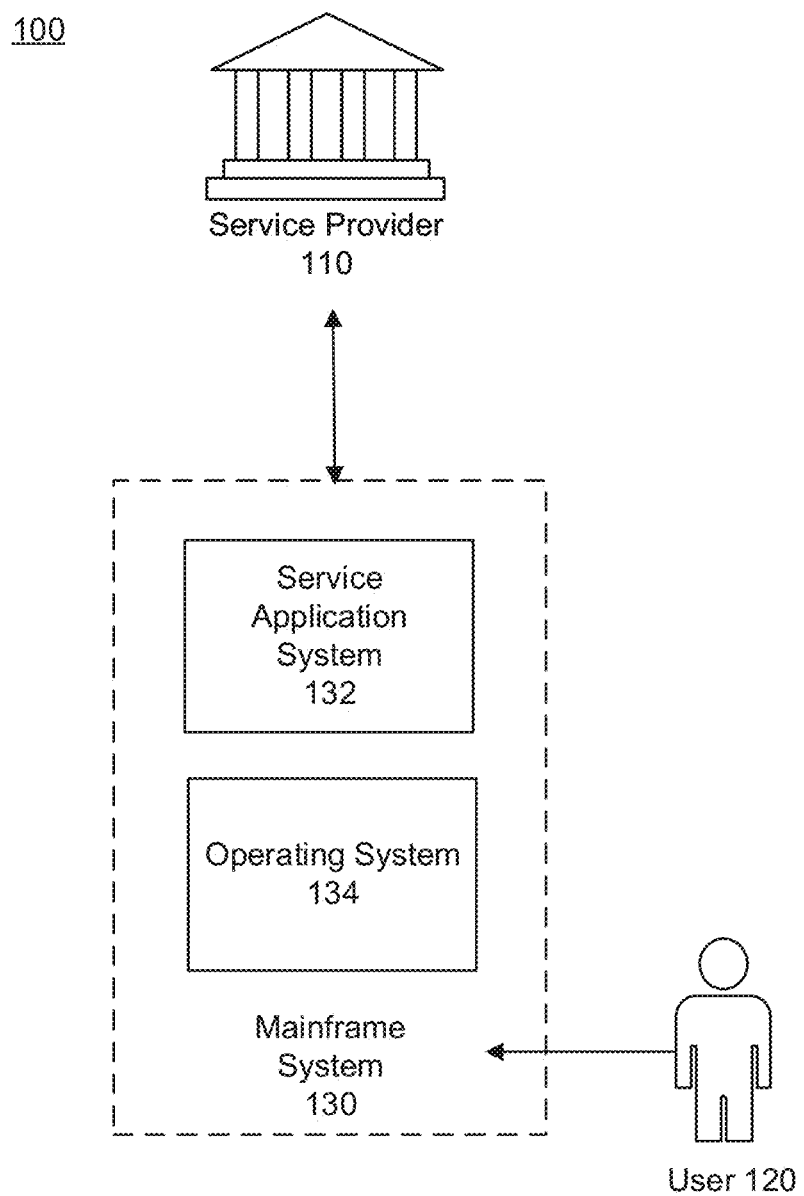
FIG. 1 is a schematic diagram of an example system for processing or analyzing a processing application, consistent with the disclosed embodiments.

The disclosed embodiments include systems and methods for analyzing applications. Before explaining certain embodiments of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the accompanying drawings, are for the purpose of description and should not be regarded as limiting.

As such, those skilled in the art will appreciate that the conception upon which this disclosure is based may readily be utilized as a basis for designing other structures, methods, and systems for carrying out the several purposes of the present disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Reference will now be made in detail to the present example embodiments of the disclosure, examples of which are illustrated in the accompanying drawings. Wherever possible, the same reference numbers will be used throughout the drawings to refer to the same or like parts.

Mainframes, in some embodiments, are a type of computer that generally are known for their large size, amount of storage, processing power and high level of reliability. Large organizations primarily use mainframes for critical applications requiring high volumes of data processing. In general, most mainframes have the ability to run multiple operating systems. In addition, mainframes can add or swap system capacity without disruption and handle very high volume input and output. Even one single mainframe can replace dozens or small hundred servers.

FIG. 1 is a schematic diagram illustrating an example system 100 for processing an analysis of a service application, consistent with the disclosed embodiments. As shown in FIG. 1, system 100 includes service provider 110, and mainframe system 130. In FIG. 1, service provider 110 may provide processing service to mainframe system 130, such as a service application system 132 or an operating system 134. Consistent with the present disclosure, service provider 110 receives one or more requests for processing analysis from mainframe system 130. In the disclosed embodiments, mainframe system 130 may be developed and operated by a third-party service provider authorized by service provider 110 to process analysis. In other embodiments, mainframe system 130 may be associated with one or more service provider 110 for processing financial analysis.

Service provider 110 may be an entity that provides services in any type of industries. For example, service provider 110 may be a bank, a health insurance center, airline company, retail company, or another type of entity that configures, offers, provides, and/or manages data information, such as users' identification and passwords of a bank, policy holder's earnings, past history records, passengers' personal information to reserve the tickets from airline company, etc. These data information can also be provided by user 120 to mainframe system 130. Service provider 110 may include one or more components that perform processes consistent with the disclosed embodiments. The computer systems of service provider 110 may be communicatively connected to service application system 132 and operating system 134 in mainframe system 130. In some embodiments, one or more components in service provider 110 may cooperate to perform processes consistent with the disclosed embodiments.

Mainframe system 130 may include one or more of service application system 132 or operating system 134. Service application system 132 may be implemented as a computer or other electronic device operable to receive an analysis request from service provider 110. In some embodiments, service application system 132 may include as a bank application, a ticket reserved application, or retail inventory application configured to receive data associated with user 120. In other embodiments, service application system 132 may include one or more other service applications. Service application system 132 may receive a user data record (e.g., a user's identification/password for a bank account or personal information to reserve tickets) from service provider 110. For example, the analysis is to understand existing application components of a mainframe environment to list detail and summary of the components and know interdependency between components in the application. Service application system 132 may be configured to receive instructions from service provider 110 or user 120 for transmitting user data records to operating system 134. Mainframe system 130 can store information about application analysis requests for later, real-time, or near real-time analysis.

Operating system 134 may be a computer system for completing an application analysis using software. For example, operating system 134 can be z/OS, z/virtual machine (z/VM), z/virtual storage extended (z/VSE), or z/transaction processing facility (z/TPF), HPE NonStop, Linux, Unisys OS 2200, OpenVMS, or any other operating systems.

In some embodiments, operating system 134 is operatively connected to, and controls the operations in, one or more applications in service application system 132. Operating system 134 may monitor specific instructions that are executed in the mainframe system 130. In some embodiments, operating system 134 is used to monitor the activity in a service application system 132 while a build of a software program is being executed by a process or processes under the control of operating system 134. In response to a particular service application in service application system 132. When executed, the operating system 134 would record information about the particular service application (e.g., about the instruction that was executed against a particular file or files in service application system 132) and would return the recorded information to the process that initiated the particular service application.

Figure 2:
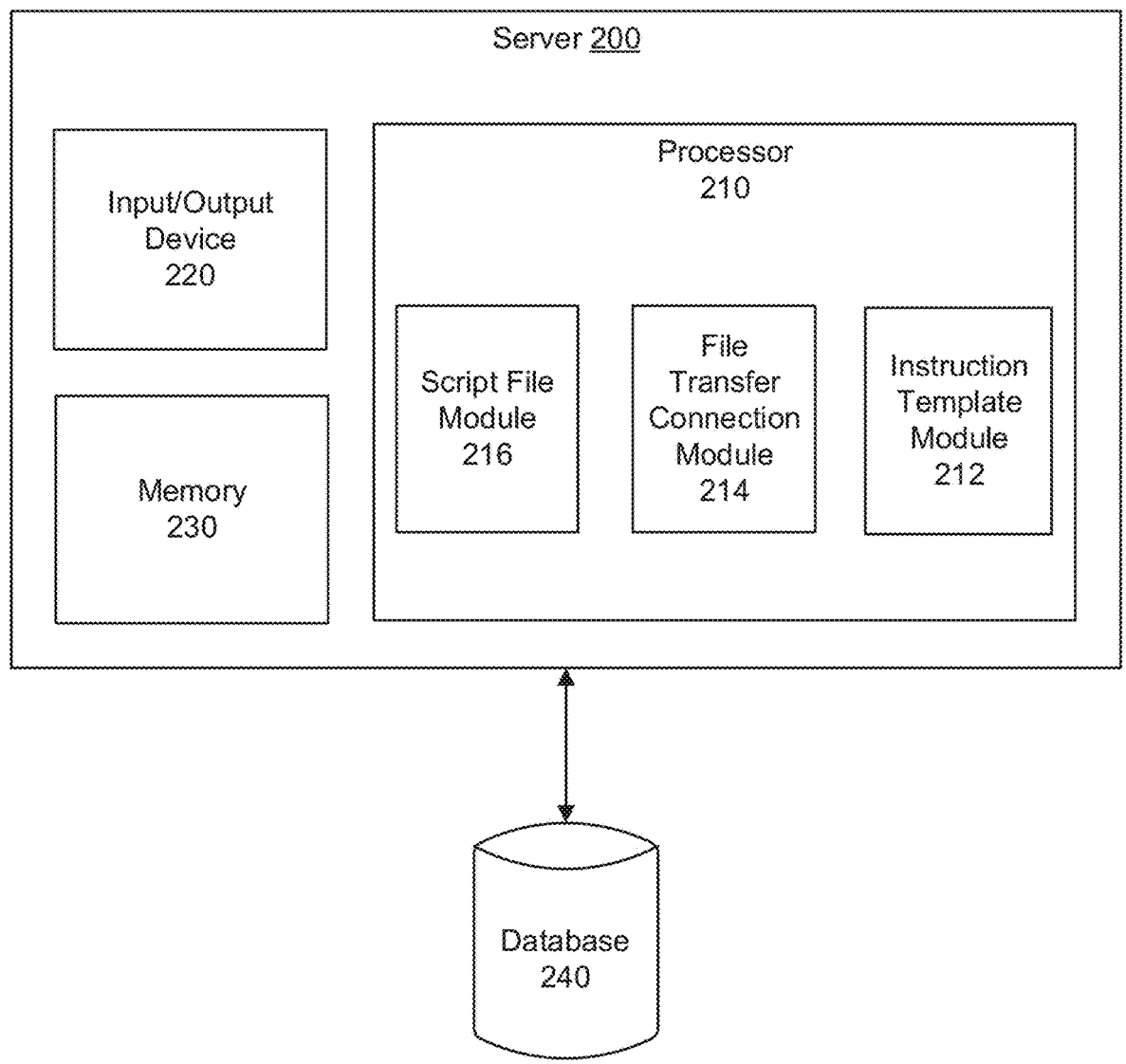
FIG. 2 is a block diagram of an example server computer system for processing or analyzing a processing application, consistent with the disclosed embodiments.

FIG. 2 is a block diagram of an example server computer system 200 (referred to as "server 200" hereinafter) used in system 100, consistent with the disclosed embodiments. For example, service provider 110 may comprise server 200. Server 200 may be one or more computing devices configured to execute software instructions stored in memory to perform one or more processes consistent with the disclosed embodiments. For example, server 200 may include one or more memory devices for storing data and software instructions and one or more hardware processors to analyze the data and execute the software instructions to perform server-based functions, operations, or analysis of data In FIG. 2, server 200 includes a hardware processor 210, an input/output (I/O) device 220, a memory 230, and database 240. It should be noted that server 200 may include any number of those components and may further include any number of any other components. Server 200 may be standalone, or it may be part of a subsystem, which may be part of a larger system. For example, server 200 may represent distributed servers that are remotely located and communicate over a network.

Processor 210 may include or one or more known processing devices, such as, for example, a microprocessor. In some embodiments, processor 210 may include any type of single or multi-core processor, mobile device microcontroller, central processing unit, etc. In operation, processor 210 may execute computer instructions (e.g., program codes) and may perform functions in accordance with techniques described herein. Computer instructions may include routines, programs, objects, components, data structures, procedures, modules, and functions, which may perform particular processes described herein. In some embodiments, such instructions may be stored in memory 230, processor 210, or elsewhere. Consistent with the disclosed embodiments, processor 210 may include instruction template module 212 configured to include a plurality of main streams. In some embodiments, each of the main streams is a job stream that includes a sequence of job control language statements (JCLs). For example, the job stream consists of a sequence of jobs to be run, together with times, priorities, and other dependencies that determine the order of processing. The JCL informs operating system 134 what to do in order to process data. The JCL is configured by a JCL statement that contains a series of rules. The operating system can be indicated by JCL statements which processes needed to be operated, i.e., which program need to be executed, or which resources are needed by the programs.

For example, instruction template module 212 includes a job control language file which has a set of JCL statements which instruct the processor 210 what work to perform. For example, processor 212 can transmit a job control language file from instruction template module 212 to file transfer connection module 214. File transfer connection module 214 uses job control language file as an input to further connect to the server 200. Script file module 216 includes a series of commands to be executed to process and read the job control language file from file transfer connection module 212.

The processor 210 also includes file transfer connection module 214, and script file module 216 for processing the analysis request. In other embodiments, instruction template module 212, file transfer connection module 214, and/or script file module 216 may be organized or arranged separately from instruction template module 212. In further embodiments, file transfer connection module 214 and script file module 216 may be combined into one module serving the functions of both modules.

I/O device 220 may be one or more devices configured to allow data to be received and/or transmitted by server 200. I/O device 220 may include one or more customer I/O devices and/or components, such as those associated with a keyboard, mouse, touchscreen, display, etc. I/O device 220 may also include one or more digital and/or analog communication devices that allow server 200 to communicate with other machines and devices, such as other components of system 100. I/O device 220 may also include interface hardware configured to receive input information and/or display or otherwise provide output information. For example, I/O device 220 may include a monitor configured to display a customer interface.

Memory 230 may include one or more storage devices configured to store instructions used by processor 210 to perform functions related to disclosed embodiments. For example, memory 230 may be configured with one or more software instructions associated with programs and/or data.

Memory 230 may include a single program that performs the functions of the server 200, or multiple programs. Additionally, processor 210 may execute one or more programs located remotely from server 200. Memory 230 may also store data that may reflect any type of information in any format that the system may use to perform operations consistent with disclosed embodiments. Memory 230 may be a volatile or non-volatile (e.g., ROM, RAM, PROM, EPROM, EEPROM, flash memory, etc.), magnetic, semiconductor, tape, optical, removable, non-removable, or another type of storage device or tangible (i.e., non-transitory) computer-readable medium.

Server 200 may also be communicatively connected to one or more databases. For example, server 200 may be communicatively connected to database 240. Database 240 may be a database implemented in a computer system (e.g., a database server computer) in service provider 110. Database 240 may include one or more memory devices that store information and are accessed and/or managed through server 200. By way of example, database 240 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, server 200 may include database 240. Alternatively, database 240 may be located remotely from the server 200. Database 240 may include computing components (e.g., database management system, database server, etc.) configured to receive and process requests for data stored in memory devices of database 240 and to provide data from database 240.

Figure 3:
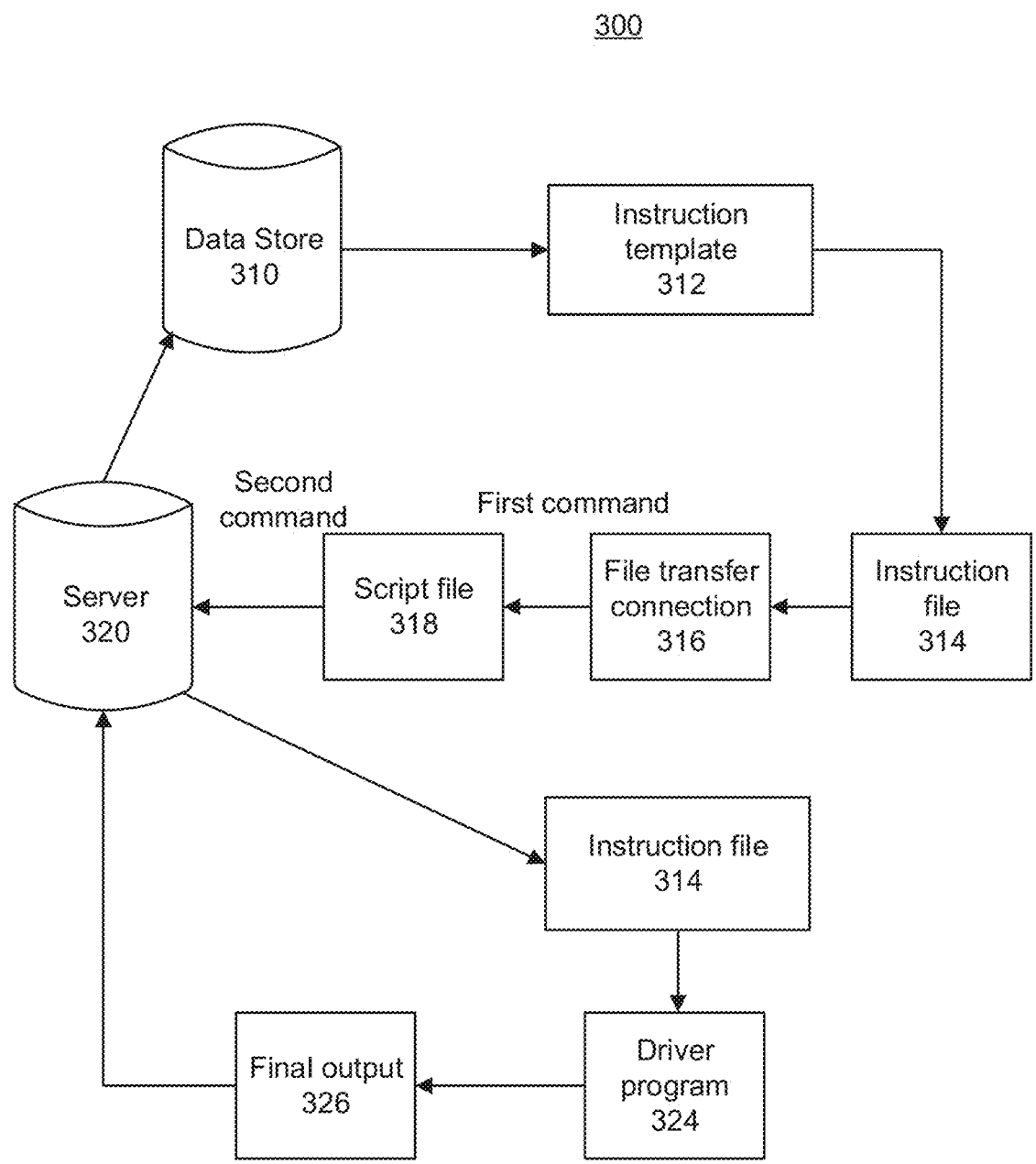
FIG. 3 is a block diagram of an example mainframe application tool used across the system shown in FIG. 1, consistent with the disclosed embodiments.

FIG. 3 depicts an example mainframe application tool 300 used in mainframe system 130, consistent with the disclosed embodiments. Mainframe tool 300 can represent a central data repository or a hub that may permit an organization to use this platform to support their core applications. Mainframe application tool 300 can include data store 310. Data store 310 can include at least one user data record from server 320. Instruction template 312 may add at least one user data record from data store 310. In some embodiments, instruction template 312 uses user data records as user parameters (i.e., user identification or user password). It should be noted that instruction template 312 can add any other type of information and not limited to the above examples. Mainframe tool 300 includes an instruction file 314, a file transfer connection 316, and a script file 318. Instruction template 312 may include main streams. In some embodiments, each of the main streams is a job stream that includes a sequence of job control language statements (JCLs) corresponding to user parameters. Mainframe application tool 300 creates instruction file 314 from the instruction template 312 to include the main streams and user parameters. Instruction file 314 may be inputted into the file transfer connection 316 along with a first command. File transfer connection 316 can be used to execute the first command, and then quit from file transfer connection 316. In some embodiments, the first command may be a job entry subsystem ("JES") command. For example, file transfer connection 316 uses a JES command to receive main streams (i.e., JCLs) into the file transfer connection 316, to schedule JCLs for processing by file transfer connection 316, and to control output processing. Mainframe application tool 300 then creates script file 318 after exiting from file transfer connection 316.

Script file 318 may be used to input file transfer connection 316 along with a second command. For example, script file 318 may also include main streams corresponding to the user parameters as same as file transfer connection 316. In some embodiments, script file 318 may pause for a period of time (i.e., from 10-15 minutes) after adding main streams and user parameters. The second command can be used to execute script file 318. In some embodiments, the second command may be a shell command. For example, the shell command reads the input file transfer connection 316 into the script file 318, then executes the file transfer 316 to establish the connection to server 320.

Mainframe application tool 300 transmits instruction file 314 to the server 320 through file transfer connection 316 and script file 318. Different institutions (e.g., service provider 110 of system 100) can offer a variety of different types of central data repository or a hub with different incentives or features. Each of these different central data repositories may be assigned one or more file transfer connections 316 and one or more script files 318. Instruction file 314 is obtained from server 320 again for using with a particular driver program 324. In some embodiments, driver program 324 can be a common business-oriented language (COBOL) program, restructured extended executor (REXX) program, or Easytrieve program to be created as a pre-defined driver program for instruction template 312. It should be noted that driver program 324 is not limited to the above examples and may be any other source codes which can use environment variables to open JCLs. For example, a driver program 324 is stored in the mainframe application tool 300 even before instruction template 312 receiving the at least one user data records. Driver program 324 is used to open each of the main streams by using pre-defined variable records to retrieve in-streams of each of the main streams. For example, in-streams are the procedures inside a single JCL to perform a particular function. When the procedure is coded within the same JCL, it is an in-stream procedure. A procedure can achieve parallel execution of one program, when one program using multiple input files. Final output 326 includes main streams and in-streams aggregating associated with user parameters to transmit back to server 320. In some embodiments, server 320 processes final output 326 to create a visualization of final output 326.

Figure 4A:
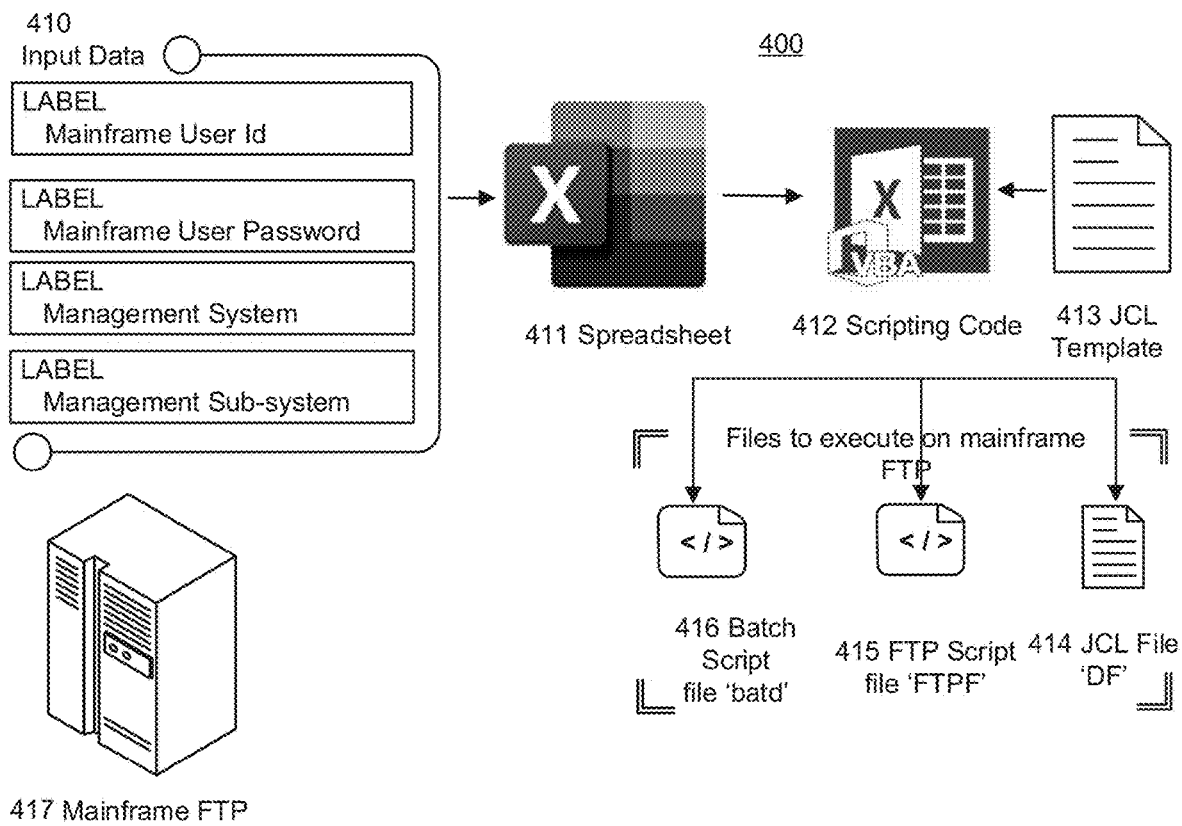
FIG. 4A-4B are schematic diagrams of an example mainframe application tool used in the system shown in FIG. 1, consistent with the disclosed embodiments.

FIG. 4A is a block diagram of an example of across mainframe application tool 400 used in mainframe system 130, consistent with the disclosed embodiments. For example, the mainframe application tool 400 may use spreadsheet software to analyze the entire application. As shown in FIG. 4, mainframe application tool 400 may include an input data 410, spreadsheet 411, and scripting code 412. In some embodiments, mainframe application tool 400 may use other programs to replace spreadsheet 411 along with scripting code 412. In some embodiments, mainframe application tool 400 may include additional components. In some embodiments, the components of mainframe application tool 400 can be split among additional components, can be part of the same component, or can be separated across a network such as a LAN or WAN. In some embodiments the components of mainframe application tool 400 can be part of, for example, mainframe system 130 of system 100. In other embodiments, mainframe application tool 400 can be implemented as part of service provider 130 of system 100.

The elements of mainframe application tool 400 can also be implemented on server 200. For example, mainframe ftp 417 of mainframe application tool 400 can be the same as processor 210 of server 200. In some embodiments, input data 410 can be the same data as saved in database 240 of server 200. For example, input data includes information as for mainframe user id, mainframe user password, management system, management sub-system. In some embodiments, input data includes other types of information such as patients' medical records, customers' transactions in the retail industry, and passengers' tickets reservation in railway and airlines. The components of mainframe application tool 400, such as input data 410, spreadsheet 411, and scripting code 412, may be implemented as software (e.g., program codes stored in memory 230), hardware (e.g., a specialized chip incorporated in or in communication with processor 210), or a combination of both.

Spreadsheet 411 may be a high availability or highly scalable program or set of programs that can receive and process analysis requests and communications of service provider 110, such as those originating from service application system 132. In some embodiments, spreadsheet 411 with scripting code 412 may request user for a list of parameters including one or more of information: mainframe user id, passwords, management system, and management sub-system. For example, spreadsheet 411 can be MICROSOFT EXCEL and scripting code 412 can be MICROSOFT VISUAL BASIC for Applications code (i.e., VBA code). It should be noted that spreadsheet 411 and scripting code are not limited to the above examples, and mainframe application tool 400 can use other programs and code to receive and process analysis. Job control language (JCL) template 413 adds the input data 410 of one of the applications from the spreadsheet 411. In some embodiments, JCL template 413 may also implemented as instruction template 312 in mainframe application tool 300. Spreadsheet 411 may also receive analysis requests to from user 120 or other components of system 100.

JCL template 413 processes user data records from input data 410 and create a driver as JCL file 414. For example, the driver JCL file 414 includes a series of application JCLs corresponding to at least one or more parameters of mainframe user id or passwords. JCL template 413 can also use any other data related to analysis of service applications which requested by other types of the service providers or users.

File transfer connection (FTP) script file 415 is coded to use JCL file 414 as an input to receive a list of parameters of mainframe user identification, mainframe password, and a special mainframe command. For example, the special mainframe command is a JES command. The JES command in the FTP file 415 specifies the input parameters to be accessed and the output parameters to be created or updated. The FTP script file 415 is executed by using the JES command to trigger the driver JCL file 414 and establish the connection to the mainframe FTP 417.

Mainframe application tool 400 then creates batch script file 416 after exiting from the FTP file 415. In some embodiments, Batch script file 416 is coded to use the FTP file 415 as an input to receive the list of parameters of mainframe user identification, mainframe password, and a Shell command. The Shell command in the Batch script file 416 reads the FTP file as an input. For example, Batch script file 416 is then executed on mainframe FTP 417 by using the Shell command. In some embodiments, mainframe application tool 400 issues FTP file 415 to transmit the driver JCL file 414 to the mainframe FTP 417. The components of JCL file 414, FTP file 415, Batch script file 416 may be implemented as modules (e.g., instruction template module 212, file transfer connection module 214, script file module 216) incorporated into a processor 210. It should be noted that spreadsheet 411 and scripting code 412 can be any other user interface tool as long as it can execute the FTP file 415 and Batch script file 416 by taking user inputs, such as FTP address, mainframe user id, mainframe user password.

Figure 4B:
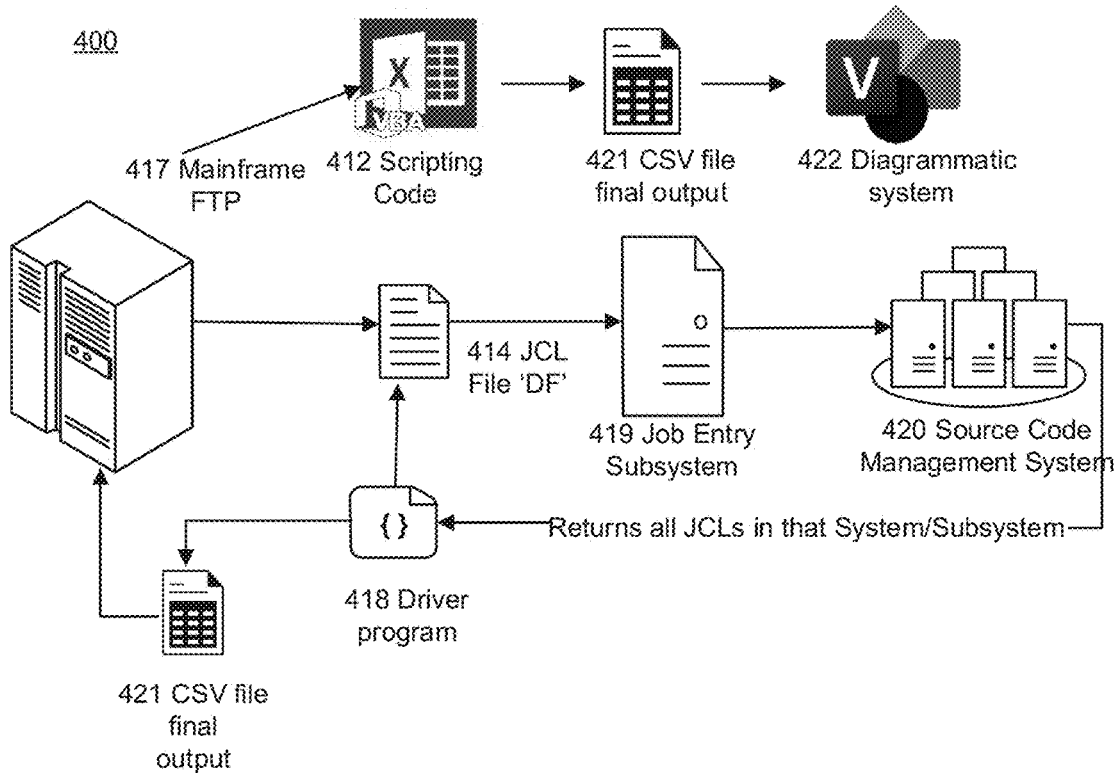

FIG. 4B is a schematic diagram of an example of across mainframe application tool 400 following the JCL file 414, FTP file 415, and Batch script file 416 are executed on mainframe FTP 417. Driver program 418 is stored in the mainframe application tool 400 before input data transmitting to spreadsheet 411. Mainframe application tool 400 transmits driver program 418 as an input to the JCL file 414. Mainframe application tool 400 submits JCL file 414 to job entry subsystem 419 and JCL file 414 is executed in job entry subsystem 419. Source code management system 420 incorporates in a batch mode for the JCL file 414 to process a list of application JCLs of the JCL file 414. Mainframe application tool 400 returns the list of application JCLs of the source code management system 420 and the job entry subsystem to driver program 418. For example, driver program 418 can be a COBOL program, REXX program, Easytrieve program, or any other program can use environment variables to open JCLs. Source code management system 420 can be an Endevor system, Panvalet system, Changeman system, or any other system can generate reports that list JCLs for an application. It should be noted that driver program 418 and source code management system 420 are not limited to the above examples, mainframe application tool 400 may implement any type of program or source code system to process JCL file 414.

In some embodiments, driver program 418 opens each of the list of application JCLs of JCL files 414 to retrieve procedures from each of the application JCLs. Driver program 418 generates a comma-separated value (CSV) file 421 as a final output. For example, driver program 418 is a COBOL program which consists of many programming languages that execute business processes. The programming languages have one or more data input file and one or more output files. Further, each of the input/output files has own corresponding layouts which known as copybooks (e.g., xml, json). The COBOL program can be executed from the JCL file 414. The JCL file 414 has the following details: the location of the COBOL program binary file, the path to the location of the input data file, the path to the location of the output data, and the path to the location of the copy books can be found. Each application JCL in the JCL file 414 has more than one procedure, and each of the procedures has more than one program. Each of the programs includes input files/output files which have own corresponding layouts as copybooks. When driver program 418 opens each of JCL files 414, driver program 418 initiates the processing of JCL files 414 to retrieve more than one application JCL in each of the JCL files 414 and retrieve more than one procedure of each of the application JCL.

Mainframe application tool 400 sends CSV file 421 back to the mainframe FTP 417. For example, spreadsheet 411 receives the CSV file 421 from mainframe FTP 417 after CSV file 421 back to the mainframe FTP 417. In some embodiment, spreadsheet 411 waits for a period of time to receive the CSV file 421. Further, scripting code 412 processes CSV file 421 to communicate with a diagrammatic system 422. Spreadsheet 411, driver program 418 and diagrammatic system 422 may be implemented as software (e.g., program codes stored in memory 230), hardware (e.g., a specialized chip incorporated in or in communication with processor 210), or a combination of both.

Diagrammatic system 422 generates visualizations of the aggregated data from CSV file 421 for display on any type of dashboard. For example, the CSV file 421, described in more detail below in reference to FIGS. 5 and 6, can provide insight of the application. In some embodiments, the visualization can further provide a summary of each application that user's needs. For example, diagrammatic system 422 can be a Visio program to generate visualization of the aggregated data from CSV file 421. It should be noted that, diagrammatic system 422 is not limited to the above example, mainframe application tool 400 may implement any other type of diagrammatic programs to generate visualizations from the CSV file 421.

Figure 5:
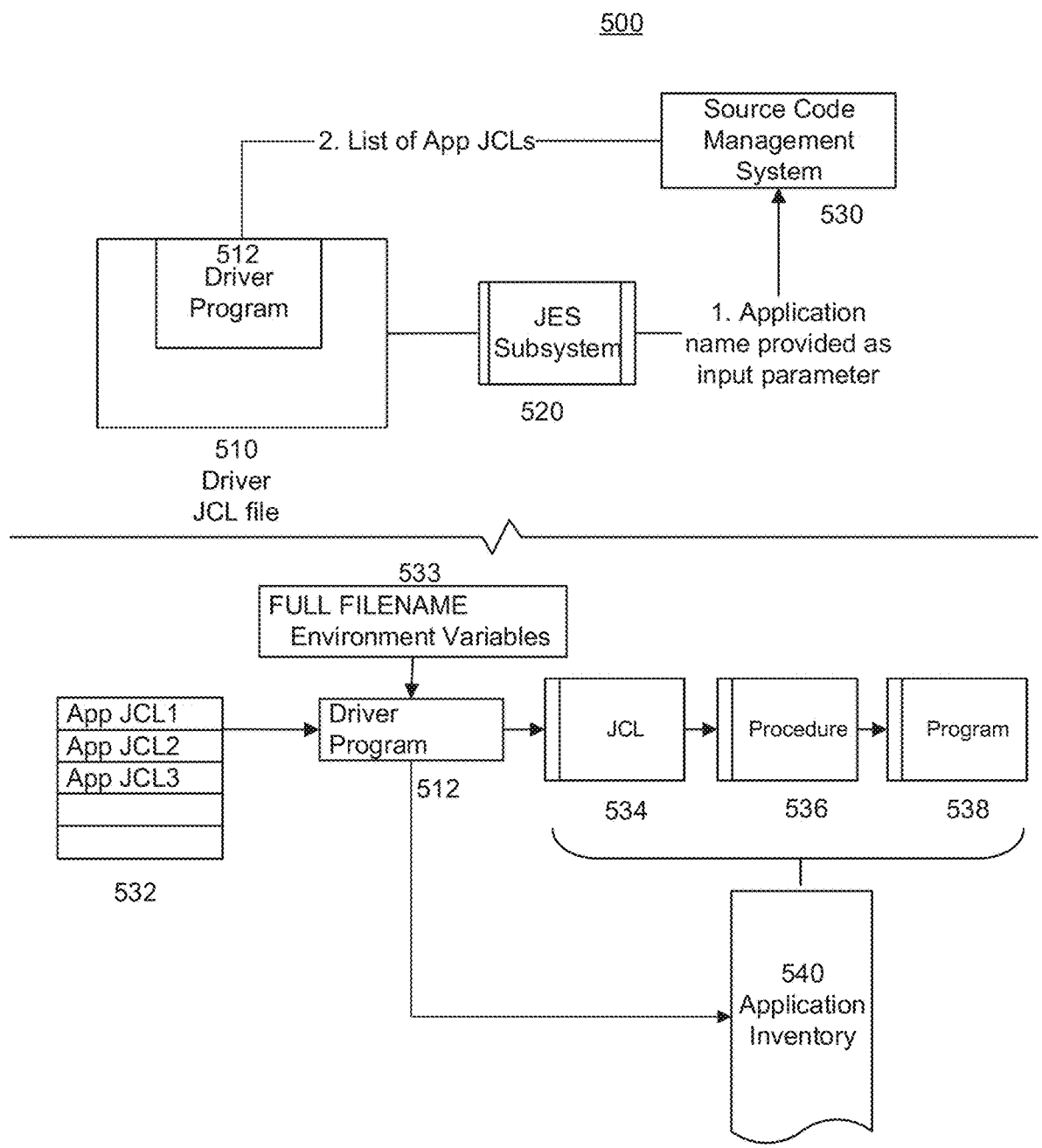
FIG. 5 is a block diagram of an example of inside a mainframe application tool for processing a list of processing application inventory shown in FIG. 4A-4B, consistent with the disclosed embodiments.

FIG. 5 is a block diagram of an example of inside a mainframe application tool 500 used in mainframe system 130 or server 200, consistent with the disclosed embodiments. Mainframe application tool 500 sends driver JCL file 510 to the job entry subsystem 520 to execute. Then, job entry subsystem 520 communicates with source code management system 530 by providing the application name from driver JCL 510. In some embodiments, source code management system 530 receives a list of JCLs corresponding to a specific application name from the driver JCL file 510. Source code management system 530 returns a complete list of JCLs correspond to the specific application. In some embodiments, multiple application names can be processed between driver JCL file 510 and source code management system 530. For example, source code management system 530 can return each list of JCLs from each of the application names. Driver program 512 inside the driver JCL file 510 receives a complete list of application JCLs 532. Mainframe application tool 500 transmits environment variables 533 into driver program 512. Driver program 512 opens each JCL 534 to retrieve procedures 536 by using environment variables 533. Subsequently, driver program 512 opens each procedure 536 to retrieve each program 538. In some embodiments, driver program 536 further open each procedure 536 to retrieve a list of input files, output files, and control cards. Driver program 512 can open each program 538 to retrieve a list of copybooks which are the corresponding layout of input files and output files. Application inventory 540 includes a list of all JCLs 534, procedures 536, and programs 538. For example, application inventory 540 can be in CSV format. In some embodiments, application inventory 540 further includes a list of input/output files, copybooks, and control cards.

Figure 6:
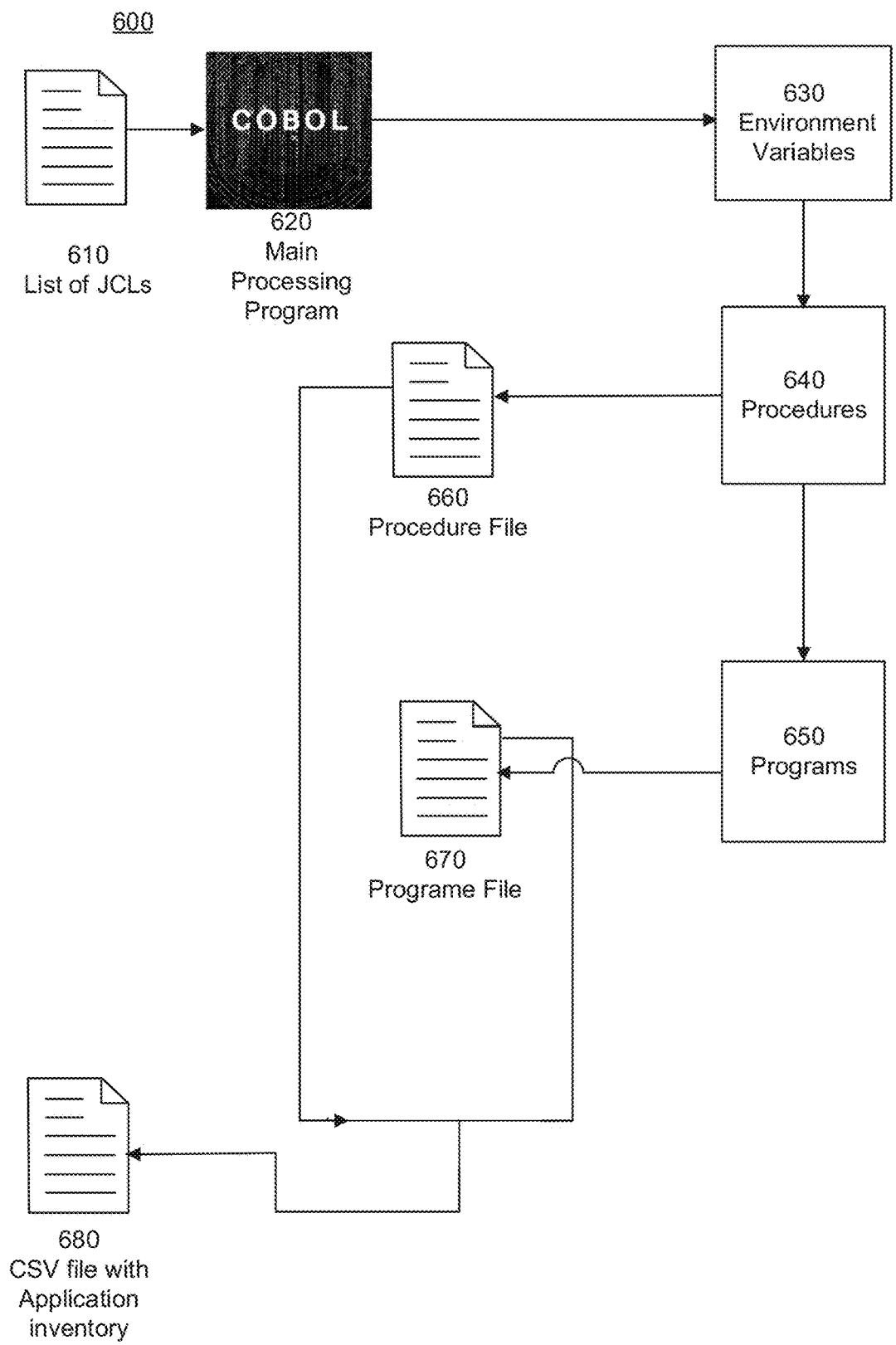
FIG. 6 depicts an example of a mainframe application tool for analyzing processing application captured using the system shown in FIG. 1, consistent with the disclosed embodiments.

FIG. 6 is an example of another mainframe application tool 600 used in mainframe system 130 or server 200, consistent with the disclosed embodiments. A list of JCLs 610 are entered into main processing program 620. In some embodiments, a main processing program 620 can be a COBOL program. It should be noted that main processing program 620 is not limited to the above example and may be a REXX program, Easytrieve program, or any other programs have capability to use environment variables 630. Main processing program 620 uses environment variables 630 to open each JCL 610 to retrieve a list of procedures 640. When the main processing program 620 encounters procedures 640, main processing program 620 opens and execute the procedures 640. Procedure file 660 includes a list of executed procedures 640 used in each JCL 610 and a list of input files, output files, and controls cards used in each of the executed procedures 640. When main processing program 620 further encounters programs 650, main processing program 620 opens and execute the programs 650.

Program file 670 includes a list of all executed programs 650 used in each procedure 640 and a list of all copybooks, corresponding layout of input/output files, referenced in each executed program 650. CSV file 680 is created to include both procedure file 660 and program file 670 as application inventory.

Figure 7:
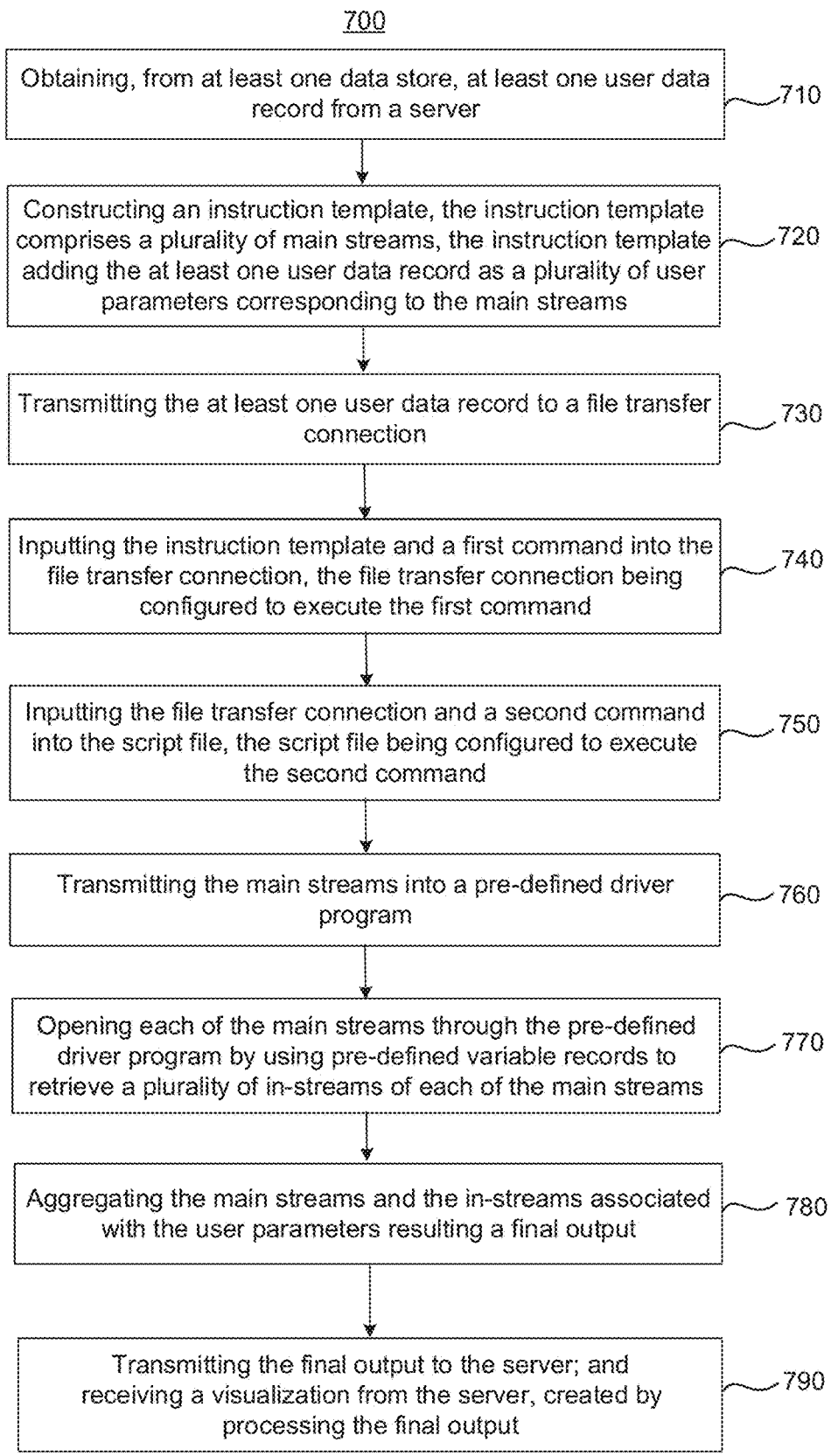
FIG. 7 is a flowchart of an example process for analyzing user data in the system shown in FIG. 1, consistent with the disclosed embodiments.

FIG. 7 is a flowchart of an example process 700 for analyzing user data in mainframe 130 or server 200, consistent with the disclosed embodiments. Process 700 may be a process performed by a process performed by a computer-implemented system (e.g., server 200) or in mainframe system 130. The computer-implemented system may include a memory (e.g., memory 230) that stores instructions and a processor (e.g., processor 210) programmed to execute the instructions to implement process 700. For example, process 700 may be implemented as one or more software modules stored in memory 230 and executable by processor 210. Process 700 can also be performed by mainframe application tool 300 in FIG. 3.

Referring to FIG. 7, at step 710, the processor obtains user data record from multiple data sources and from various component in system 100. The data may be stored in, for example, memory 230, database 240, data store 310, mainframe FTP 417, or other components described above. The data include, among other things, retail inventory data, policy holder's information data, or user's identification/password data.

Referring to FIG. 7, at step 720, the processor may construct an instruction template to include a plurality of main streams from the data sources. Because the data may originate from different systems, the data can be normalized so that common information has the same format and structure. For example, at step 720, the processor may construct all account holder data to include user identification and user passwords. In some embodiments, other data may be constructed such as addresses, organizations' names, date formats, or similar types of information. Additional examples of data construction for the instruction template that the processor can apply to the input data includes, for example, such as details of the source code management system or source code management sub-system, dates, phone numbers, and social security numbers into a standard format. After constructing the instruction template to add user data records from the various data sources, the processor may transform the user data records as user parameters corresponding to the main streams so that related data records can be analyzed. For example, data that contains the user identification, user passwords, and the details of the source code management system and subsystem can create a driver file (e.g., JCL file 414) and associated with, for example, other data sources that have information on the different service applications by the institution. The processor may further transmit user data record to a file transfer connection at step 730.

Referring to FIG. 7, at step 740, the processor inputs the instruction template and a first command into the file transfer connection. The processor executes the first command embedded in the file transfer connection. For example, the first command can be a JES execution command. The file transfer connection is executed using the JES execution command to establish the connection to the server.

Referring to FIG. 7 at step 750, the processor inputs the file transfer connection and a second command into a script file. The processor executes the second command embedded in the script file. For example, the second command can be a Shell command. As described above, the processor executes the script file by using the Shell command. After step 750, once the script file being executed, the processor transmits the instruction template into a driver program at step 760.

Referring to FIG. 7 at step 770, the processor opens each of the main streams through the pre-defined driver program by using pre-defined variable records to retrieve a plurality of in-streams of each of the main streams. For example, main streams may be a plurality of JCLs and in-streams may be a plurality of procedures. The processor can execute the driver program by using JCLs and procedures.

Referring to FIG. 7 at step 780, the processor can utilize the output of the driver program applied to the data and use the aggregated data to generate visualizations of the data. The processor aggregates the main streams and the in-streams associated with the user parameters resulting a final output.

At step 790, the processor transmits the final output to the server and receive the visualization, created by processing the final output, from the server. As shown above in FIGS. 4A-4B, the visualizations can be created through a diagrammatic system. Additionally, the visualization may be provided as data, images, rendered form, or in another data format through a software Visio or remote procedure call that allows a third-party system to display the visualizations. The visualizations can include one or more of data visualizations described above or may include additional views of the data and predictive models not otherwise described.

Figure 8:
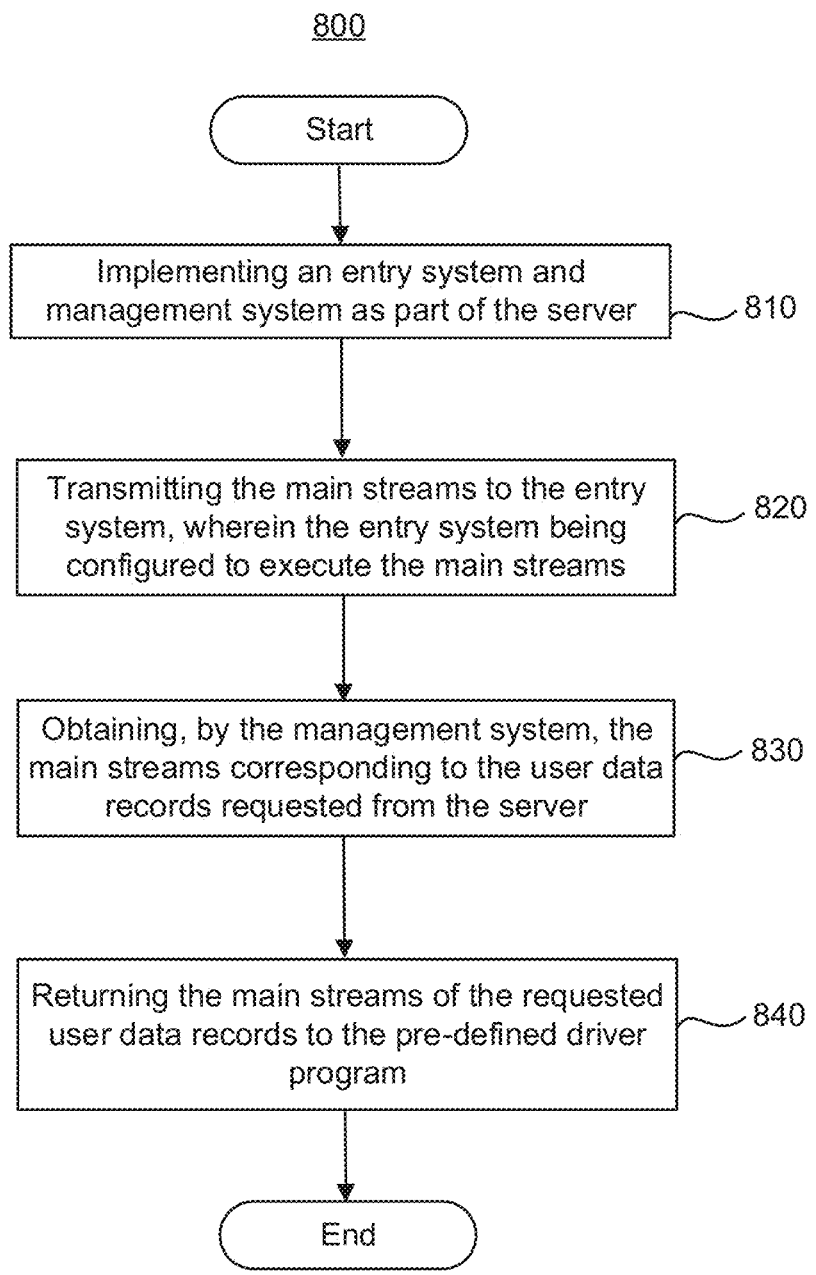
FIG. 8 is a flowchart of an example process for transmitting user data in the system shown in FIG. 1, consistent with the disclosed embodiments.

FIG. 8 is a flowchart of an example process 800 for transmitting the main streams into a pre-defined driver program in mainframe system 130 or server 200, consistent with the disclosed embodiments. Process 800 may be a process performed by a process performed by a mainframe system 130 or a computer-implemented system (e.g., server 200). The computer-implemented system may include a memory (e.g., memory 230) that stores instructions and a processor (e.g., processor 210) programmed to execute the instructions to implement process 800. For example, process 800 may be implemented as one or more software modules stored in processor 210 and executable by processor 210.

Referring to FIG. 8, at step 810, the processor implements an entry system and a management system as part of server 200. The information of systems may be stored in, for example, memory 230, database 240, mainframe FTP 417, or other components described above. For example, the entry system may be a job entry subsystem and the management system can be a source code management system. For example, the job entry subsystem which uses to receive jobs into the operating system, schedule jobs for processing by operating system, and control job's output processing. For example, the source code management system provides control of jobs as individual elements.

Referring to FIG. 8, at step 820, the processor transmits the main streams to the entry system, for example, the system that executes the main streams.

At step 830, the processor obtains the main streams by the management system, the main streams corresponding to the user data records requested from the server 200. For example, the main streams can be executed in the entry system and further provide the application name along with the list of main streams. In some embodiments, the management system can be in batch mode and return the list of main streams for the one of the applications. Referring to FIG. 8, at step 840, the processor returns the main streams of the requested user data record to the pre-defined driver program 324.

A non-transitory computer-readable medium may be provided that stores instructions for a processor (e.g., processor 210) for processing user data according to the example flowcharts of FIGS. 7-8 above, consistent with embodiments in the present disclosure. For example, the instructions stored in the non-transitory computer-readable medium may be executed by the processor for performing processes 700, 800 or in part or in entirety. Common forms of non-transitory media include, for example, a floppy disk, a flexible disk, hard disk, solid-state drive, magnetic tape, or any other magnetic data storage medium, a Compact Disc Read-Only Memory (CD-ROM), any other optical data storage medium, any physical medium with patterns of holes, a Random Access Memory (RAM), a Programmable Read-Only Memory (PROM), and Erasable Programmable Read-Only Memory (EPROM), a FLASH-EPROM or any other flash memory, Non-Volatile Random Access Memory (NVRAM), a cache, a register, any other memory chip or cartridge, and networked versions of the same.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as VISUAL BASIC, C, etc.), JAVA, C++, Objective-C, R, PYTHON, HTML, HTML/AJAX combinations, XML, or HTML with included JAVA applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system comprising:
   a non-transitory computer-readable medium configured to store instructions; and
   at least one processor configured to execute the instructions to perform operations comprising:
      obtaining, from at least one data store, at least one user data record from a server;
      transmitting the at least one user data record to a file transfer connection;
      inputting an instruction template and a first command into the file transfer connection, the file transfer connection being configured to execute the first command;
      inputting the file transfer connection and a second command into a script file, the script file being configured to execute the second command;
      transmitting a plurality of main streams into a pre-defined driver program;
      aggregating the plurality of main streams and a plurality of in-streams associated with a plurality of user parameters resulting in a final output, the plurality of user parameters associated with the at least one user data record; and
      transmitting the final output to the server.

2. The computer-implemented system of claim 1, wherein the operation of the transmitting the plurality of main streams into the pre-defined driver program further comprises:
   opening each of the plurality of main streams through the pre-defined driver program by using pre-defined variable records to retrieve the plurality of in-streams of each of the main streams;
   implementing an entry system and a management system as part of the server;
   transmitting the plurality of main streams to the entry system, the entry system being configured to execute the plurality of main streams;
   obtaining, by the management system, the plurality of main streams corresponding to the at least one user data record obtained from the server; and
   returning the plurality of main streams of the requested at least one user data record to the pre-defined driver program.

3. The computer-implemented system of claim 1, wherein the plurality of main streams are a series of job control languages (JCLs) that corresponds to the at least one user record, and wherein the plurality of in-streams are a series of procedures used in each of the JCLs.

4. The computer-implemented system of claim 1, wherein each of the series of procedures comprises a series of programs used in each of the procedures and each of the series of programs comprises a series of copybooks used in each of the programs.

5. The computer-implemented system of claim 4, wherein the operations further comprise:
   opening each of the series of procedures through the pre-defined driver program by using pre-defined variable records to retrieve the series of programs of each of the series of procedures; and
   opening each of the series of programs through the pre-defined driver program by using the pre-defined variable records to retrieve the series of copybooks of each of the series of programs.

6. The computer-implemented system of claim 4, wherein the final output comprises at least one of the series of JCLs, the series of procedures, the series of programs, and the series of copybooks.

7. The computer-implemented system of claim 1, wherein the operation of inputting the file transfer connection and the second command into the script file further comprises:
   pausing the script file for a period of time; and
   executing the second command by the script file.

8. The computer-implemented system of claim 1, wherein the operations further comprise:

connecting the file transfer connection to the server based on the file transfer connection being configured to execute the first command; and connecting the script file to the server based on the script file being configured to execute the second command.

9. The computer-implemented system of claim 1, wherein the at least one user data record comprises at least one user identification and at least one user password.

10. The computer-implemented system of claim 1, wherein the operations further comprise:

creating a visualization by processing the final output, and displaying the visualization on a graphical user interface.

11. A computer-implemented method comprising:

obtaining, from at least one data store, at least one user data record from a server;

transmitting the at least one user data record to a file transfer connection;

inputting an instruction template and a first command into the file transfer connection, the file transfer connection being configured to execute the first command;

inputting the file transfer connection and a second command into a script file, the script file being configured to execute the second command;

transmitting a plurality of main streams into a pre-defined driver program;

aggregating the plurality of main streams and a plurality of in-streams associated with a plurality of user parameters resulting in a final output, the plurality of user parameters associated with the at least one user data record; and transmitting the final output to the server.

12. The computer-implemented method of claim 11, wherein transmitting the plurality of main streams into the pre-defined driver program further comprises:

opening each of the plurality of main streams through the pre-defined driver program by using pre-defined variable records to retrieve the plurality of instreams of each of the main streams;

implementing an entry system and a management system as part of the server;

transmitting the plurality of main streams to the entry system, the entry system being configured to execute the plurality of main streams;

obtaining, by the management system, the plurality of main streams corresponding to the at least one user data record obtained from the server; and returning the plurality of main streams of the requested at least one user data record to the pre-defined driver program.

13. The computer-implemented method of claim 11, wherein the plurality of main streams are a series of job control languages (JCLs) that corresponds to the at least one user record, and wherein the plurality of in-streams are a series of procedures used in each of the JCLs.

14. The computer-implemented method of claim 11, wherein each of the series of procedures comprises a series of programs used in each of the procedures, and each of the series of programs comprises a series of copybooks used in each of the programs.

15. The computer-implemented method of claim 14, wherein the method further comprises:

opening each of the series of procedures through the pre-defined driver program by using pre-defined variable records to retrieve the series of programs of each of the series of procedures; and opening each of the series of programs through the pre-defined driver program by using the pre-defined variable records to retrieve the series of copybooks of each of the series of programs.

16. The computer-implemented method of claim 14, wherein the final output comprises at least one of the series of JCLs, the series of procedures, the series of programs, and the series of copybooks.

17. The computer-implemented method of claim 11, wherein inputting the file transfer connection and the second command into the script file further comprises:

pausing the script file for a period of time; and executing the second command by the script file.

18. The computer-implemented method of claim 11, wherein the method further comprises:

connecting the file transfer connection to the server based on the file transfer connection being configured to execute the first command; and connecting the script file to the server based on the scrip file being configured to execute the second command.

19. The computer-implemented method of claim 11, wherein the at least one user data record comprises at least one user identification and at least one user password.

20. The computer-implemented method of claim 11, wherein the method further comprises:

creating a visualization by processing the final output, and displaying the visualization on a graphical user interface.

* * * * *